United States Patent
Ranta

Patent Number: 5,943,647
Date of Patent: Aug. 24, 1999

[54] SPEECH RECOGNITION BASED ON HMMS

[75] Inventor: Jari Ranta, Espoo, Finland

[73] Assignee: Tecnomen Oy, Espoo, Finland

[21] Appl. No.: 08/869,408

[22] Filed: Jun. 5, 1997

Related U.S. Application Data

[63] Continuation of application No. 08/453,381, May 30, 1995, abandoned.

[30] Foreign Application Priority Data

May 30, 1994 [FI] Finland .................................. 942518

[51] Int. Cl.$^6$ .............................. G06E 1/00; G10L 3/02; G10L 5/02

[52] U.S. Cl. ......................... 704/251; 704/222; 704/252; 704/254

[58] Field of Search ....................... 381/29–45; 395/2.31, 395/2.54; 704/251, 525, 254, 222

[56] References Cited

U.S. PATENT DOCUMENTS

| | | | |
|---|---|---|---|
| 4,815,134 | 3/1989 | Picone et al. | 381/31 |
| 5,274,739 | 12/1993 | Woodard | 395/2 |
| 5,371,853 | 12/1994 | Kao et al. | 395/232 |
| 5,414,796 | 5/1995 | Jacobs et al. | 395/2.3 |
| 5,455,888 | 10/1995 | Iyengat et al. | 395/212 |
| 5,533,138 | 7/1996 | Kim et al. | 382/232 |
| 5,590,242 | 12/1996 | Juang et al. | 395/2.54 |

OTHER PUBLICATIONS

S. Nakagawa et al., "A New Speech Recognition Method Based on VQ–Distortion Measure and HMM", Proceedings of Int'l. Conference on Acoustics, Speech and Signal Processing, pp. II–676 to II–679, Minneapolis, MN, Apr., 1993.

Y. Linde et al., "An Algorithm for Vector Quantizer Design", IEEE Transactions on Communications, vol. COM–28, No. 1, Jan. 1980.

L.R. Rabiner et al. "Higher Performance Connected Digit Recognition Using Hidden Markov Models", IEEE Transactions on Acoustics Speech and Signal Processing, vol. 37, pp. 1214–1225, Aug. 1989.

High Accuracy Speaker Verification System Specification Sheet, Apr. 1992, Ensigma Ltd., Turing House, Station Road, Chepstow, Gwent, NP6 5PB, United Kingdom.

D.K. Burton, "Text–Dependent Speaker Verification Using Vector Quantization Source Coding", IEEE Transactions on Acoustics, Speech and Signal Processing, vol. ASSP–35, No. 2, pp. 133–143, Feb. 1987.

H. Hermansky, "Perceptual Linear Predictive (PLP) Analysis of Speech", Journal of Acoustical Society of America, vol. 87, No. 4, Apr. 1990, pp. 1738–1752.

*Primary Examiner*—Fan S. Tsang
*Assistant Examiner*—Allan Hoosain
*Attorney, Agent, or Firm*—Michael L. Dunn

[57] ABSTRACT

A speech recognition method that combines HMMs and vector quantization to model the speech signal and adds spectral derivative information in the speech parameters. Each state of a HMM is modeled by two different VQ-codebooks. One is trained by using the spectral parameters and the second is trained by using the spectral derivative parameters.

1 Claim, 2 Drawing Sheets

SPEECH RECOGNITION BASED ON HMMS

This application is a File Wrapper Continuation application of U.S. application Ser. No. 08/453,381, filed May 30, 1995, now abandoned.

BACKGROUND OF THE INVENTION

The accuracy of speaker independent speech recognition is inadequate with current algorithms, especially when the recognition is done through dialed-up telephone lines. The accuracy of a speech recognizer means the ability to recognize an utterance by comparing it to the system's precomputed word templates.

Traditionally, Hidden Markov Models (HMM) that are based on probability theory are used in speech recognizers. During the recognition phase a probability that a certain model can produce the utterance is computed. The model that has the highest probability is selected as the recognized word.

A speech recognition method that uses vector quantization (VQ) with HMMs instead of statistical pattern matching is known as described in S. Nakagawa and H. Suzuki, "A New Speech Recognition Method Based on VQ-Distortion Measure and HMM", *Proceedings of International Conference on Acoustics, Speech and Signal Processing*, pp. II-676 to II-679, Minneapolis, Minn., U.S.A., Apr. 27–30, 1993, incorporated herein by reference. During the recognition phase the squared error is computed between a word template and a given utterance. Word templates are HMMs where each state has its own VQ-codebook. Every VQ-codebook is computed from training data with the LBG-vector quantization algorithm as described in Y. Linde, A. Buzo, R. M. Gray, "An Algorithm for Vector Quantizer Design", *IEEE Transactions on Communications*, Vol. COM-28, No. 1, January 1980, incorporated herein by reference, and it contains the typical speech parameters that occur in that state. A template that gives the smallest square error is chosen as the recognized word. The modified Viterbi-algorithm that is used in computing the distance is also presented in Nakagawa et al. supra. A speech recognizer that uses HMMs with continuous mixture densities is presented in L. R. Rabiner, J. G. Wilpon and F. K. Soong, "Higher Performance Connected Digit Recognition Using Hidden Markov Models", *IEEE Transactions on Acoustics Speech and Signal Processing*, Vol. 37, pp. 1214–1225, August 1989, incorporated herein by reference. It uses the cepstrum derived from LPC-analysis and its derivative as the speech parameters (spectral derivative). The vector that is computed from speech contains short-term information about spectral changes in the signal (via the cepstrum) and the short-time spectral derivative contains information from longer time span (via the delta cepstrum). By adding the spectral derivative to the speech parameters a more accurate, 2-dimensional presentation of the time-varying speech signal is obtained (frequency and time). According to Rabiner et al. supra, this enhances the recognition accuracy of HMM-model that uses continuous mixture densities. However, the recognition accuracy with both of these methods is inadequate.

One known algorithm that is used for speaker verification gives a 1% false recognition and false rejection rate when using numbers from zero to nine to perform verification, High Accuracy Speaker Verification System Specification Sheet, April 1992, Ensigma Ltd., Turing House, Station Road, Chepstow, Gwent, NP6 5PB, United Kingdom, incorporated herein by reference. (The reference does not mention how many numbers the user has to speak during the verification process.)

BRIEF DESCRIPTION OF THE INVENTION

Figure 1:
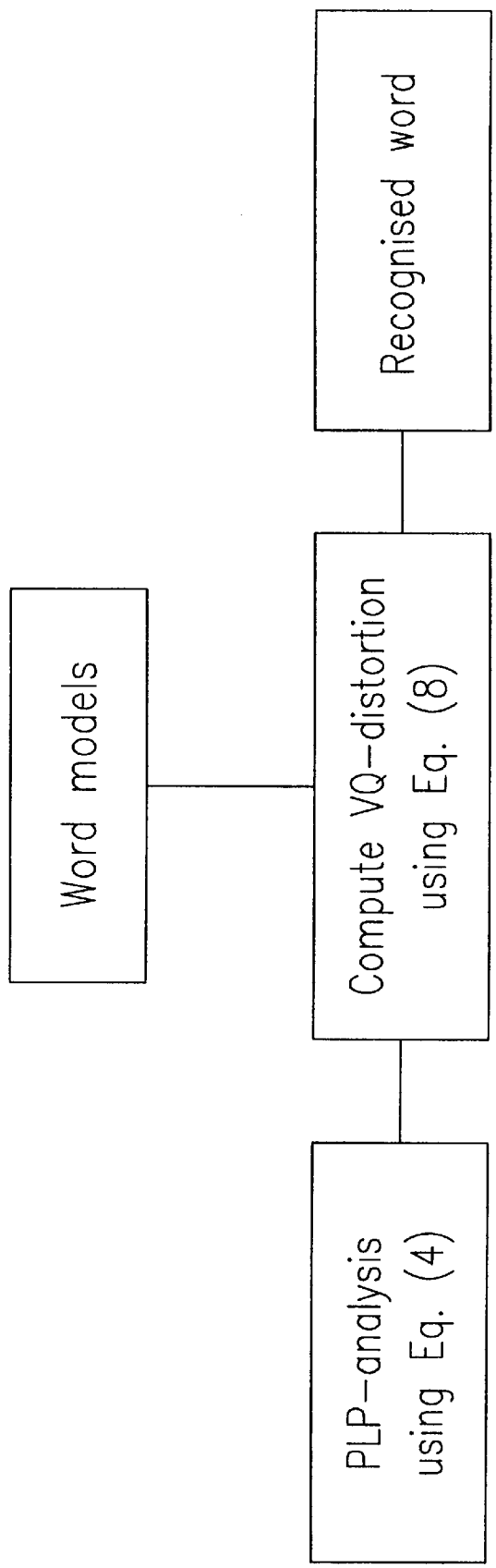
FIG. 1 is a block diagram of the different phases of speech recognition.

The invention comprises a method for speech recognition using a Hidden Markov Model which comprises:

sensing a plurality of vocal utterances;

converting each of the sensed utterances into an electronic signal carrying information concerning a wave pattern of the utterance;

using PLP-analysis of the signal for computing speech parameters to create a word template;

generating codebooks of known templates of known utterances by using an LBG algorithm;

computing a VQ-distortion of a speech utterance template from templates in said codebooks;

selecting a word, from the codebooks, having a known word template that gives the smallest VQ distortion from the template of an unknown utterance;

characterized in that the LBG-algorithm is used to create known word templates separately for spectral parameters and spectral derivative parameters and that separate codebooks are used for each template set, both codebooks being used to model states of a Hidden Markov Model.

The idea is to combine the methods presented in Nakagawa et al. and Rabiner et al. supra, i.e., to add the spectral derivative shown in Rabiner et al. supra to the speech parameters of the HMM-VQ algorithm in Nakagawa et al. supra and to obtain better recognition accuracy.

A speech recognizer in Nakagawa et al. supra that uses a VQ-distortion measure is compared to the known statistical HMMs which use continuous or discrete mixture densities and the superiority of the HMM-VQ over traditional HMM is clearly shown. Because the use of spectral derivative in statistical HMMs improves recognition accuracy, by adding the spectral derivative to the HMM-VQ model the recognition accuracy can improve even more. The spectral derivatives contain information from longer time period. By combining the two parameter sets a higher recognition rate can be obtained than using the speech spectrum alone as in Nakagawa et al. supra. During the training process separate VQ-codebooks are computed for speech spectrum and spectral derivatives.

When using test data that was obtained through dialed-up telephone lines the recognition accuracy was higher when compared to the method of Nakagawa et al. supra. 100 speakers were used for training and 25 different speakers were used for testing. The vocabulary consisted from eleven Finnish words and an accuracy of 98.85% was obtained. If a threshold was set so that the relative distance between the best and the second best word must be greater than 10% before a valid word is recognized, a 100% accuracy was obtained while 1.5% of the input was rejected. Reference gives a recognition accuracy of 100%, but the test data is recorded over a high quality microphone. Speech is much harder to recognized from the telephone because the bandwidth is limited and the frequency responses of the telephone lines can greatly vary.

DETAILED DESCRIPTION OF THE INVENTION

Hidden Markov Model (HMM) as used herein is a doubly stochastic process with an underlying stochastic process that is not observable (it is hidden), but it can only be observed through another set of stochastic processes that produce the sequence of observed symbols.

Perceptual Linear Predictive (PLP) analysis as used herein is a speech analyzing technique that uses the psychophysics of hearing to derive an estimate of the auditory spectrum. The auditory spectrum is then approximated by an autoregressive all-pole model.

Vector Quantization (VQ) distortion as used herein is the difference between two vectors which is computed according to some distortion measure. The distortion measure which is used here is the squared-error distortion that can be expressed as:

$$d(c, vq) = \sum_{m=1}^{5} (c(m) - vq(m))^2$$

LBG-algorithm as used herein is a method for designing vector quantizers from a training sequence of data. The LBG-algorithm produces codebooks from the training data that are locally optimal.

Spectral parameters define the speech spectrum in a short time frame (15 ms). A cepstral approximation of the all-pole model spectra is used here.

Spectral derivative parameters are obtained from the spectral parameters. Spectral derivative means the weighted average of the spectral parameters obtained from the analysis phase. The average is computed over a short time window according to equation (2).

The proposed method can be used for speech recognition in the same way as statistical HMMs. The units of speech that are to be recognized can be either words, phonemes, triphones, etc.

The application can be, for example, a voicemail system where the menu commands are given by speech instead of touch tones (" . . . if you want to listen to a message press 3 . . . "). The system is trained to recognize a small vocabulary of command words which is compared against the speech uttered by the user.

The same algorithm can also be used for speaker verification and preliminary experiments gave promising results. By using just one word for verification the error rate was 0.21%. The error is computed by multiplying the number of false rejections and the number of false recognitions and taking the square root of the result, D. K. Burton, "Test-Dependent Speaker Verification Using Vector Quantization Source Coding", *IEEE Transactions on Acoustics, Speech and Signal Processinq*, Vol. ASSP-35, No. 2, pp. 133–143, February 1987, incorporated herein by reference. Five different "real" speakers were used in the test which were compared to 185 impostors. The word models were computed from five repetitions of a word. (Compare this to the High Accuracy Speaker Verification System of Ensigma Ltd. that gives less than 1% of false rejection rate). The error rate obtained in Burton, supra, was 3.2% and high quality speech samples were used for testing.

The ability to recognize the speaker through telephone is important in voicemail applications when the telephone cannot send DTMF-tones. In such a case there is no other reliable method to recognize the caller than his own voice.

Operational Description

A method for discrete speaker independent speech recognition is presented in the following. The recognition method uses HMMs with vector quantization for representing the speech parameters. The HMM is a simple state machine where transition can occur only to current or to the next state. Block diagram of the different phases in speech recognition is given in FIG. 1. The new speech recognizer uses HMM models so that each state is described by two different VQ-codebooks. One is obtained using the spectral parameters computed with the PLP-analysis, H. Hermansky, "Perceptual Linear Predictive (PLP) Analysis of Speech", *Journal of Acoustical Society of America*, Vol. 87, No. 4, April 1990, pp. 1738–1752, incorporated herein by reference, and the other is obtained by using the spectral derivative parameters.

Different Phases of the Recognition

1. Speech analysis

Speech that is to be recognized is analyzed with PLP-analysis, Hermansky, supra, in 30 ms parts and by using 15 ms intervals. Analysis phase give speech parameters $cc_l(m)$ where $1 \leq m \leq 5$, representing this 15 ms frame. Vector $cc_l(m)$ at time instant l is weighted with window $W_c(m)$, that results in:

$$c_l(m) = cc_l(m) * W_c(m) \qquad (1)$$

2. Computing of the parameters

Rabiner et al., supra, describes how the use of spectral derivative enhances the recognition accuracy of a statistical HMM. Spectral derivative means the weighted average of spectral parameters obtained from the analysis phase. The average is computed over a short time window according to equation (2):

$$\Delta c_l(m) = \left[ \sum_{k=-K}^{K} k c_{l-k}(m) \right] * G, 1 \leq m \leq 5, K = 2 \qquad (2)$$

where G is an amplification factor selected so that the variances of the vectors $c_l(m)$ and $\Delta c_l(m)$ are equal. The value used here was 0.2. By combining these two vectors a parameter set that describes time frame l is obtained:

$$O_l = \{c_l(m), \Delta c_l(m)\} \qquad (3)$$

which consists of ten elements. The speech parameter set is denoted by C and the spectral derivative parameter is denoted by $\Delta C$, i.e., $$C = \{c_l(m)\} \text{ and } \Delta C = \{\Delta c_l(m)\} \qquad (4)$$

3. Training phase

Figure 2:
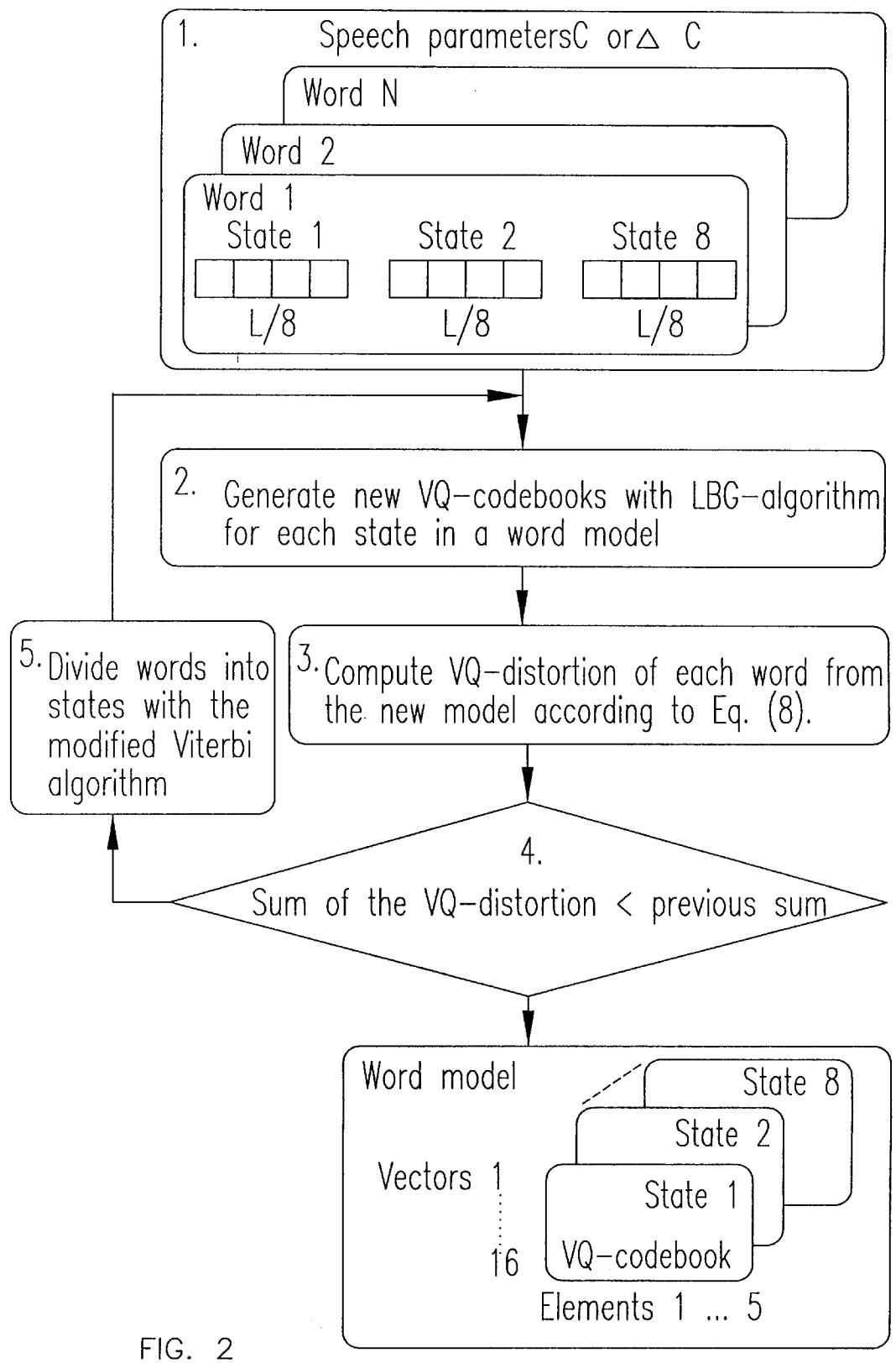
FIG. 2 is a block diagram of the training process for the speech recognition method of the invention.

The word templates are trained separately for spectral parameters C and for spectral derivative parameters $\Delta C$. Templates are trained by using a vector quantization algorithm and the training process is illustrated in FIG. 2.

1. Speech samples that are used for training are first analyzed with PLP-analysis and the vectors C and $\Delta C$ are obtained. These vectors describe the speech at 15 ms intervals. Each analyzed speech sample is first divided linearly into states so that each state has equal amounts of vectors. The states correspond to states in a HMM. If a HMM with 8 states is needed, each analyzed speech sample is divided in eight 2. A separate codebook is computed for each state in a HMM. The vector quantization algorithm is applied on every vector on every state from every sample. For example, all the vectors that belong to state one in every speech sample are used to create the codebook for state one. The same is done for states from two to eight. The codebooks contain a set of vectors that give the minimum square distance between the vectors used for training. There are several algorithms to design a vector quantizer, a method presented in Linde et al., supra, is used here.

3. When the optimal codebooks are computed from training vectors, the VQ-distortion of each speech sample from the model is computed. The sum denotes the "goodness" of the model. The smaller the total distortion, the better the model represents the words that were used when the model was created.

4. The sum is compared to the sum obtained from the previous iteration. If the sum is larger than the previous sum, training ends.

5. If the new sum is smaller, the speech samples are divided into new set of states and the learning process continues from step 2. The optimum state sequence is found by using the Viterbi-algorithm.

It is important that the speech samples are collected from the same environment where the recognizer is intended to be used. If there is a need to recognize speech through telephone, then the word templates must be trained with words that are collected through telephone. If different environments are used in training and in recognizing, recognition accuracy will degrade substantially.

4. Distance calculation

Distance of a word is computed between the uttered speech and word template. Distance D from each word template is computed with the modified Viterbi algorithm, Nakagawa et al., supra, according to the following equation:

$$D = \min_{x} \sum_{i=1}^{L} \{d(c_i, VQ_{x_i}) + d(\Delta c_i, VQ_{x_i}) + d(x_{i-1}, x_i)\} \quad (5)$$

Here $x_0 x_1 \ldots x_L$ means the state sequence of a HMM and $VQ_{x_i}$ means codebook at state $x_i$. The number of states in HMM is denoted by S, i.e., $1 \leq x_i \leq S$. L is the number of frames in a word. $d(x_{i-1}, x_i)$ is zero if there is a transition from state $x_{i-1}$ to state $X_i$, otherwise $d(x_{i-1}, x_i) = \infty$. $d(c_i, VQ_{x_i})$ denotes the smallest distance between vectors $c_i$ and $VQ_{x_i}$ which is defined as:

$$d(c_i, VQ_{x_i}) = \min_{j} d(c_i, vq_j), vq_j \in VQ_{x_i} \quad (6)$$

$d(c_i, vq_j)$ is defined as:

$$d(c_i, vq_j) = \sum_{m=1}^{5} (c_i(m) - vq_j(m))^2 \quad (7)$$

Here $vq_j$ is a component in the codebook. The number of components in one codebook $VQ_{x_i}$ is a power of two, usually 16 or 32. Equation (7) computes the smallest square error between the vector $c_i$ and the codebook component $vq_j$. Equation (6) computes the smallest square error between the vector $c_i$ and codebook $VQ_{x_i}$. Similarly $d(\Delta c_i, VQ_{x_i})$ denotes the smallest distance between vectors $\Delta c_i$ and $VQ_{x_i}$. The Viterbi algorithm given in Linde et al. supra is computed recursively so that the VQ-distortion is added at the same time for both parameter sets. I.e., the smallest square distance computed for the spectral parameters and for the spectral derivative parameters. This can be written as:

$$g(j, t) = \min_{i}\{g(i, t-1) + d(c_t, VQ_j) + d(\Delta c_t, VQ_j) + d(i, j)\} \quad (8)$$

$$D = g(S, L), t = 1, 2, \ldots, L \ \ ja \ \ j = 1, 2, \ldots, S$$

Here is the idea of the invention in mathematical form. The term $d(\Delta c_t, VQ_j)$ is added to the Viterbi algorithm and equation (8) is computed for each 15 ms time frame t. There is also a possibility to use two HMMs where the first is computed using the spectral parameters and the second is computed using the spectral derivative parameters. The results from these two models are then added together with appropriate weighting to obtain the final recognition result.

What is claimed is:

1. A method for speech recognition using a Hidden Markov Model which comprises:
   sensing a plurality of vocal utterances;
   converting each of the sensed utterances into an electronic signal carrying information concerning a wave pattern of the utterance;
   using PLP-analysis of the signal for computing speech parameters to create a word template;
   generating several local codebooks of known templates of known utterances by using an LBG algorithm;
   computing a VQ-distortion of a speech utterance template from templates in said local codebooks;
   selecting a word, from the local codebooks, that gives the smallest VQ-distortion from the template of an unknown utterance;
   characterized in that the LBG-algorithm is used to create known word templates separately for spectral parameters and spectral derivative parameters and that separate local codebooks are used for each template set, both local codebooks being used to model states of a hidden Markov Model.

* * * * *